United States Patent
Klimstra

[15] 3,691,207
[45] Sept. 12, 1972

[54] 2 BETA-AZIDO-17 BETA-DIALKYLAMINOALKYLAMINO-5 ALPHA-ANDROSTAN-3 ALPHA-OLS, DERIVATIVES THEREOF AND INTERMEDIATES THERETO

[72] Inventor: Paul D. Klimstra, Northbrook, Ill. 60062

[73] Assignee: G. D. Searle & Co., Chicago, Ill.

[22] Filed: March 9, 1971

[21] Appl. No.: 122,527

[52] U.S. Cl. ............... 260/349, 260/397.5, 424/241
[51] Int. Cl. ........................................... C07c 117/00
[58] Field of Search ....../Machine Searched Steroids

[56] References Cited

UNITED STATES PATENTS

| | | |
|---|---|---|
| 3,084,156 | 4/1963 | Counsell et al. ......... 260/239.5 |
| 3,133,915 | 5/1964 | Counsell et al. ......... 260/239.5 |
| 3,238,194 | 3/1966 | Klimstra et al. ........ 260/239.5 |
| 3,326,758 | 6/1967 | Irmscher et al. ............ 167/65 |

*Primary Examiner*—Henry A. French
*Attorney*—John M. Brown, John J. Kolano, Elliot N. Schubert, Lowell C. Berstedt, Sybil Meloy, Walter C. Ramm and Helmuth A. Wegner

[57] ABSTRACT

The above-captioned compounds are produced from the appropriate 17-keto steroid by reaction with a dialkylaminoalkylamine; the imine thus afforded is reduced to the amine, which can be formylated to yield the formamide derivative. The instant compounds are useful as pharmacological agents as is evidenced by their anti-ulcerogenic, anti-viral, and anti-microbial activity.

4 Claims, No Drawings

2 BETA-AZIDO-17 BETA-DIALKYLAMINOALKYLAMINO-5 ALPHA-ANDROSTAN-3 ALPHA-OLS, DERIVATIVES THEREOF AND INTERMEDIATES THERETO

The present invention is concerned with novel amino substituted steroids of the androstane family, and more particularly, with 2β-azido-17β-dialkylaminoalkylamino-5α-androstan-3α-ols and the corresponding N-formyl derivatives. These compounds can be represented by the following structural formula

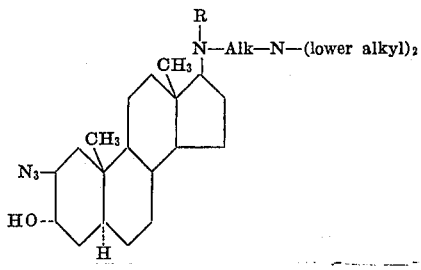

wherein R denotes hydrogen or a formyl radical and Alk denotes a lower alkylene radical.

The lower alkyl radicals intended are illustrated by methyl, ethyl, propyl, butyl, pentyl, hexyl, heptyl and the corresponding branched-chain isomers.

The lower alkylene radicals represented are illustrated by methylene, ethylene, trimethylene, tetramethylene, pentamethylene and the branched-chain isomers thereof.

The novel compounds of this invention can be prepared conveniently from 2β-azido-3β-hydroxy-5α-androstan-17-one, which compound together with its method of manufacture are disclosed in U.S. Pat. No. 3,238,194. When this starting material is treated with a dialkylaminoalkylamine, the corresponding imine is produced. For example, the condensation of 2β-azido-3α-hydroxy-5α-androstan-17-one with 2-diisopropylaminoethylamine in the presence of an acid catalyst such as p-toluenesulfonic acid affords 2β-azido-17-[N-(2-diisopropylaminoethyl)imino]-5α-androstan-3α-ol. Reduction of these novel imines with a metallic hydride yields the corresponding amine. This is illustrated by the reduction of the aforementioned imine with sodium borohydride in methanol, thus yielding 2β-azido-17β-[N-(2-diisopropylaminoethyl)amino]5α-androstan-3α-ol.

Production of the novel formamides of this invention is preferably accomplished by formylation of the amines with an appropriate formylating agent. One such agent is formic anhydride which can be conveniently prepared in situ from formic acid and acetic anhydride. In this manner, 2β-azido-17β-[N-(2-diisopropylaminoethyl)amino]5α-androstan-3α-ol, when contacted with formic acid and acetic anhydride, affords 2β-azido-17β-[N-(2-diisopropylaminoethyl)foramidoih-5α-androstan-3α-ol.

The compounds of the present invention exhibit valuable pharmacological, e.g., anti-ulcerogenic, anti-viral, anti-bacterial, anti-fungal and anti-protozoal properties.

The anti-ulcerogenic property of the instant compounds is demonstrated by their capacity to inhibit ulcer formation in the Shay rat. Details of that assay are disclosed in U.S. Pat. No. 3,459,758, issued Aug. 5, 1969.

Evidence for the anti-bacterial activity of the instant compounds is obtained from the following assay:

A mixture of 5 mg. of the test compound with 5 ml. of sterile nutrient broth is heated at 80°C. for 20 minutes, then cooled to about 25°C. and finally serially diluted and mixed with sufficient quantities of a mixture of sterile nutrient broth and 1 percent of a culture of Bacillus subtilis to produce concentrations of approximately 400, 100, 25, and 6 mcg. of compound per ml. The resulting mixtures are incubated for 20-24 hours at 37°C. Controls are provided by concurrent incubations identical with the foregoing excepting that no compound is present. Activity is determined by gross examination and potency is expressed as the minimum concentration in mcg. of compound per ml. at which no growth of the test organism is discernible.

Further evidence for the anti-bacterial activity of the instant compounds is obtained from the following assay:

Nutrient broth (manufactured by Baltimore Biological Laboratories or Difco) is prepared at twice the concentration recommended by the manufacturer, sterilized and inoculated with 2 percent (by volume) of a culture of Erwinia sp. Meanwhile the test compound is heated in sterile distilled water at a concentration of 2 mg. per ml. and a temperature of 80°C. for a period of 20 minutes. An equivolume mixture of this compound preparation and the inoculated broth is incubated aerobically at 37°C., then examined grossly for growth of the test organism. The incubation period is 24-48 hours. If growth of the test organism is observed, the compound is considered inactive. If no such growth is observed, the incubated mixture is serially diluted and mixed with an inoculated broth of the same composition as before excepting that the concentration is halved and 1 percent (by volume) of the culture instead of 2 percent is incorporated. Amounts of the latter broth are added such that the concentrations of 100, 10, and 1 mcg. of compound per ml. result. The mixtures thus obtained are incubated as before, then examined grossly for growth of the test organism. Potency is expressed as the minimum concentration at which no growth of the test organism is discernible. Controls are provided by concurrent incubations identical with the foregoing except for absence of the test compound.

The compounds of this invention display anti-fungal activity as determined by the following test procedure:

The test compound is dissolved or suspended in melted Sabouraud agar and is held at 80° C. for 20 minutes. Dilutions are made from this preparation in melted Sabouraud agar in order to yield concentrations of the test substance of 1000, 100, 10 and 1 mcg./ml. in the agar. The agar is permitted to cool and solidify and is then surface inoculated with a suspension of spores of Verticillium albo-atrum. The inoculated media are incubated at room temperature for 6–7 days, then are examined grossly for the presence or absence of growth of the test organism. Control preparations lacking the test compound are employed for comparative purposes. The activity of the compound is reported as mcg. of the compound/ml. of agar which completely prevents visible growth of the test organism.

Evidence of the anti-protozoal activity of the instant compounds is provided by a standardized test for their capacity to immobilize *Tetrahymena pyriformis*. In this test, a nutrient broth consisting of 12 gm. of proteose peptone, 8 gm. of sucrose, and 500 ml. of water is sterilized and inoculated with 10 percent (by volume) of an axenic culture of *T. pyriformis*. Meanwhile, compound is heated in sterile distilled water at a concentration of 2,000 γ per ml. and a temperature of 80° C. for 20 min. An equivolume mixture of this compound preparation and the inoculated medium is incubated aerobically at 32° C. for 48 hr. and then examined microscopically for the presence of motile tetrahymena. If any are observed, the compound is considered inactive. If no motile tetrahymena are observed, the incubated mixture is serially diluted and mixed with an inoculated medium of the same composition as that described above excepting that 1,000 parts of distilled water instead of 500 parts and 5 percent (by volume) of the culture instead of 10 percent are incorporated. Amounts of the latter medium added are such that concentrations of 100, 10, and 1 γ of compound per ml. result. The mixtures thus obtained are incubated as before and then examined microscopically for motile tetrahymena. Potency is expressed as the minimum concentration at which no motile tetrahymena are discernible. Controls are provided by concurrent incubations identical with the foregoing except for the absence of compound.

The present compounds are further useful as antiviral agents as demonstrated by the fact that they inhibit the growth of influenza virus type A (strain 575). This is demonstrated by the following test procedure. Cell cultures of primary Rhesus monkey kidney maintained in 25 cc. plastic flasks and each containing test compound at concentrations of 625, 125, 25, 5 or 1 microgram per milliliter are prepared in pairs. These flasks, and an identical pair of flasks containing no test compound, are each inoculated with a dose of influenza virus type A (strain 575) previously shown to produce maximum hemadsorption and minimum cytopathogenic effects after a 24 hour incubation. Where the cultures contain test compound, the virus is added one hour after addition of the compound to the culture. After 24 hours incubation of the cultures, the supernatant fluids are removed and 3.0 ml. of a 0.4 percent suspension of guinea pig erythrocytes are added to each flask. The flasks are then incubated at 4°C. in a horizontal position for 30 minutes. The flasks are rocked every 10 minutes during the incubation period. After this incubation, the red cell suspension is decanted from each flask, the flasks are washed twice with 3.0 ml of phosphate buffer solution (pH 7.4) to remove unadsorbed red cells, and 3.0 ml. of distilled water is then added to lyse the adsorbed cells. The flasks are then further incubated at 37°C. for 30 minutes in a horizontal position and the flasks are rocked every 10 minutes. After this incubation, the fluid contents of the pairs of flasks are combined to form an assay unit and are placed at room temperature for 15–30 minutes to allow settling of cellular debris. A pair of control flasks identical with the above, except for the absence of test compound and virus inoculation, are run concurrently. The resulting hemoglobin solutions from each assay unit are then read for optical density in a Beckman spectrophotometer at about 415 millimicrons. A test compound is considered active if, at one of the tested levels, it reduces the optical density reading by at least 50 percent relative to the virus control.

The invention will appear more fully from the examples which follow. These examples should not be construed as limiting the invention either in spirit or in scope as numerous modifications will be apparent to those skilled in the art. Quantities of material are presented in parts by weight unless otherwise noted and temperatures are given in degrees Centigrade (°C.).

EXAMPLE 1

A mixture consisting of 30 parts of 2β-azido-3α-hydroxy-5α-androstan-17-one, 18 parts of 2-diisopropylamino, 3.4 parts of p-tuluenesulfonic acid monohydrate and 220 parts of benzene is heated at the reflux temperature for about 16 hours, then is cooled and stripped of solvent under reduced pressure. The residual solid crude product is purified by recrystallization from ethyl acetate to yield pure 2β-azido-17-[N-(2-diisopropylaminoethyl)imino]-5α-androstan-3α-ol, which displays an optical rotation, in chloroform, of +40.48°. This compound is structurally represented by the following formula

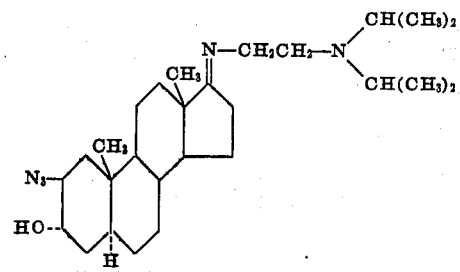

EXAMPLE 2

To a solution of 25 parts of 2β-azido-17-[N-(2-diisopropylaminoethyl)imino]5α-androstan-3α-ol in 277 parts of methanol is added 13 parts of sodium borohydride with stirring over a 15 minute period. The solution is stirred for an additional one-half hour and then water is added and the solution cooled. The resulting crude produce which precipitates is collected by filtration, washed with water and partially air dried. Then the crude product is dissolved in hot acetone, and the hot acetone solution is filtered through diatomaceous earth. The pure product, 2β-azido-17β-[N-(2-diisopropylaminoethyl)amino]5α-androstan-3α-ol is obtained upon recrystallization from acetone and displays on optical rotation, in chloroform, of +30.05°. This compound is represented by the following structural formula

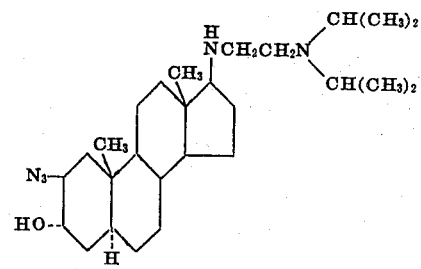

EXAMPLE 3

Substitution of an equivalent quantity of 3-dimethylaminopropylamine in the procedure of Example 1 yields 2β-azido-17β-[N-(3-dimethylaminopropyl)imino]-5α-androstan-3α-ol.

EXAMPLE 4

By substituting an equivalent quantity of 2β-azido-17β-[N-(3-dimethylaminopropyl)imino]-5α-androstan-3α-ol in the procedure of Example 2, there is obtained 2β-azido-17β-[N-(3-dimethylaminopropyl)amino]-5α-androstan-3α-ol.

EXAMPLE 5

8.0 Parts of 2β-azido-17β-[N-(2-diisopropylaminoethyl)amino]5α-androstan-3α-ol is treated with a mixture comprised of 73.2 parts of formic acid and 64.9 parts of acetic anhydride. After the reaction mixture is heated on a steam bath for 2 hours and then allowed to remain at room temperature for 1½ hours, it is neutralized by the addition of 25 percent aqueous sodium hydroxide. During the neutralization the mixture is cooled and methanol is added to retain homogeneity. Water is then added with cooling and a granular material precipitates. The precipitate is collected by filtration, washed with water, and air dried. Recrystallization of the precipitate from ethyl acetate affords pure 2β-azido-17β-[N-(2-diisopropylaminoethyl)formamido]-5α-androstan-3α-ol, which exhibits an optical rotation, in chloroform, of +10.34° and is represented by the following structural formula

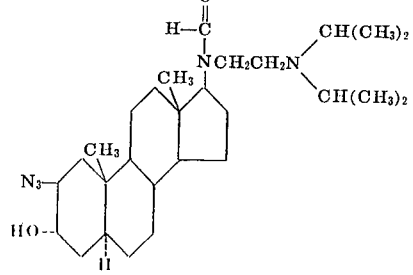

EXAMPLE 6

By substituting an equivalent quantity of 2β-azido-17β-[N-(3-dimethylaminopropyl)amino]-5α-androstan-3α-ol and otherwise following the procedure of Example 5, 2β-azido-17β-[N-(3-dimethylaminopropyl)formamido]-5α-androstan-3α-ol is produced.

What is claimed is:

1. A compound of the formula

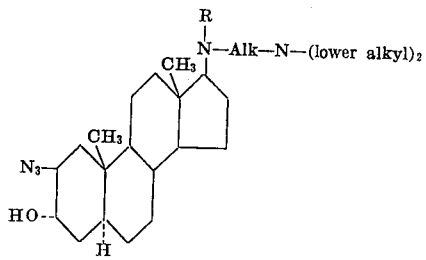

wherein R is selected from the group consisting of hydrogen and a formyl radical and Alk is a lower alkylene radical.

2. As in claim 1, the compound which is 2β-azido-17β-[N-(2-diisopropylaminoethyl)amino]-5α-androstan-3α-ol.

3. As in claim 1, the compound which is 2β-azido-17β-[N-(2-diisopropylaminoethyl)formamido]-5α-androstan-3α-ol.

4. 2β-azido-17-[N-(2-diisopropylaminoethyl)imino]-5α-androstan-3α-ol.

* * * * *